(12) United States Patent
Saito et al.

(10) Patent No.: US 8,836,486 B2
(45) Date of Patent: Sep. 16, 2014

(54) PORTABLE TRANSMITTER

(75) Inventors: Toshiaki Saito, Kariya (JP); Mitsuru Nakagawa, Chiryu (JP)

(73) Assignee: Denso Corporation, Kariya (JP)

( * ) Notice: Subject to any disclaimer, the term of this patent is extended or adjusted under 35 U.S.C. 154(b) by 117 days.

(21) Appl. No.: 12/932,848

(22) Filed: Mar. 8, 2011

(65) Prior Publication Data

US 2011/0241830 A1 Oct. 6, 2011

(30) Foreign Application Priority Data

Mar. 30, 2010 (JP) ................. 2010-078258

(51) Int. Cl.
- *G05B 11/01* (2006.01)
- *G08C 19/16* (2006.01)
- *G07C 9/00* (2006.01)
- *G05G 1/02* (2006.01)
- *H04B 1/38* (2006.01)

(52) U.S. Cl.
CPC .... G07C 9/00944 (2013.01); *H04B 2001/3866* (2013.01); *G05G 1/02* (2013.01)
USPC ...................... 340/12.55; 455/90.3

(58) Field of Classification Search
CPC ................. G07C 9/00944; G07C 2009/00952; H01H 2227/032; H01H 13/702; H01H 9/0235
USPC ............ 340/5.7, 7.63, 13.32, 5.61–5.64, 340/5.71–5.72, 12.55, 407.1–407.2, 572.8, 340/693.5, 815.48–815.49; 455/90.3, 95, 455/128, 575.1–575.9; 361/679.01
See application file for complete search history.

(56) References Cited

U.S. PATENT DOCUMENTS

| | | | | |
|---|---|---|---|---|
| 5,822,192 A * | 10/1998 | Hayashi | ......... | 361/752 |
| 6,246,019 B1 * | 6/2001 | Nakamura et al. | ......... | 200/6 A |
| 6,462,291 B1 * | 10/2002 | Sachs | ......... | 200/302.2 |
| 6,541,724 B2 * | 4/2003 | Nozawa et al. | ......... | 200/517 |
| 6,852,929 B2 * | 2/2005 | Scudder | ......... | 174/66 |
| 7,019,225 B2 * | 3/2006 | Matsumoto et al. | ......... | 200/5 R |
| 7,046,136 B2 * | 5/2006 | Sugimoto et al. | ......... | 340/539.1 |
| 7,050,292 B2 * | 5/2006 | Shimura et al. | ......... | 361/679.01 |
| 7,142,413 B2 * | 11/2006 | Sugimoto et al. | ......... | 361/679.57 |

(Continued)

FOREIGN PATENT DOCUMENTS

| | | |
|---|---|---|
| EP | 1 327 734 | 7/2003 |
| JP | 05-035980 | 5/1993 |

(Continued)

*Primary Examiner* — Hai Phan
*Assistant Examiner* — Orlando Bousono
(74) *Attorney, Agent, or Firm* — Harness, Dickey & Pierce, PLC

(57) ABSTRACT

A portable transmitter has an inner cover, an outer cover, outer knobs, a cover, a circuit substrate, etc. The cover has projection parts made of elastic material. Each projection part projects toward a corresponding opening part of the outer cover through a corresponding penetration hole of the inner case. The front end of the projection part is contacted to the corresponding outer knob. The opposite part of the projection part is contacted to a corresponding tact switch formed on the circuit substrate while the projection part is elastically deformed and the inner case accommodates the cover. Each of the outer knobs is placed in the corresponding opening part of the outer case while the outer peripheral part of the outer knob is pushed onto the outer peripheral part of the wall surface of the opening part formed in the outer case by repulsive elastic force applied from the cover.

19 Claims, 8 Drawing Sheets

(56) References Cited

U.S. PATENT DOCUMENTS

| | | | |
|---|---|---|---|
| 7,211,760 B2* | 5/2007 | Takiguchi | 200/512 |
| 7,242,278 B2* | 7/2007 | Sugimoto et al. | 340/5.62 |
| 7,463,134 B1* | 12/2008 | Stilley | 340/5.61 |
| 7,499,283 B2* | 3/2009 | De Los Santos et al. | 361/752 |
| 2004/0085251 A1* | 5/2004 | Shimura | 343/872 |
| 2004/0200709 A1* | 10/2004 | Sugimoto et al. | 200/302.2 |
| 2004/0201451 A1* | 10/2004 | Sugimoto et al. | 340/5.62 |
| 2009/0151973 A1 | 6/2009 | Fujimoto et al. | |
| 2009/0207152 A1 | 8/2009 | Nakamura | |
| 2010/0072050 A1* | 3/2010 | Kubota | 200/341 |

FOREIGN PATENT DOCUMENTS

| | | |
|---|---|---|
| JP | 2001-200664 | 7/2001 |
| JP | 2001-339176 | 12/2001 |
| JP | 2002-070373 | 3/2002 |
| JP | 2003-201781 | 7/2003 |
| JP | 2004-312621 | 11/2004 |
| JP | 2005-268945 | 9/2005 |
| JP | 2006-226026 | 8/2006 |
| JP | 2007-177520 | 7/2007 |
| JP | 2009-146670 | 7/2009 |
| JP | 2009-199729 | 9/2009 |

* cited by examiner

PORTABLE TRANSMITTER

CROSS-REFERENCE TO RELATED APPLICATION

This application is related to and claims priority from Japanese Patent Application No. 2010-078258 filed on Mar. 30, 2010, the contents of which are hereby incorporated by reference.

BACKGROUND OF THE INVENTION

1. Field of the Invention

The present invention relates to portable transmitters, in particular, equipped for use in a keyless-entry system capable of locking and unlocking various types of doors, for example, car doors without using any mechanical key.

2. Description of the Related Art

For example, there is a conventional portable transmitter for use in a keyless-entry system capable of locking and unlocking car doors without using any mechanical key. The conventional portable transmitter is comprised of an inner case, a circuit substrate, and an outer case. The inner case is comprised of a first case and a second case. The first case and the second case are assembled in one body. One or more push buttons are extended from the first case toward the outside of the first case, in other words, exposed externally. One or more tact switches are arranged on the circuit board at the position which is opposite to the push buttons. The circuit substrate is placed in the inner case. The outer case has opening parts through which the push buttons are exposed to the outside. The outer case accommodates the inner case so that the push buttons project through the corresponding opening parts of the outer case. For example, Japanese patent laid open publication number JP 2001-200664 discloses such a type of the conventional portable transmitter.

FIG. 8 is a view showing a cross section of a conventional portable transmitter having the above structure.

As shown in FIG. 8, the portable transmitter is comprised of an inner case J30 and an outer case J40. The inner case J30 is comprised of a first case J31 and a second case J32. The inner case J30 accommodates a circuit substrate J20 on which one or more tact switches J21 are mounted. The outer case J40 accommodates the inner case J30.

Specifically, the portable transmitter shown in FIG. 8, the first case J31 and the second case J32 are assembled in one body. The first case J31 has a bottom surface and side walls. The side walls enclose the bottom surface of the inner case J31. Similar to the first case J31, the second case J32 has a bottom surface and side walls. The side walls enclose the bottom surface of the inner case J32.

Further, one or more penetration holes (or through holes) J33 are formed in the first case J31 at the position which is opposite to the position of the tact switches J21 mounted on the circuit substrate J20. That is, the number of the penetration holes J33 is equal to the number of the tact switches J21 mounted on the circuit substrate J20.

Further, the inner case J30 accommodates a cover J10 so that a flange J11 of the cover J10 is sandwiched between the first case J31 and the second case J32. That is, the cover J10 has a bottom surface, side walls, and the flange J11. The side walls enclose the end part of the bottom surface of the cover J10. The flange J11 of the cover J10 is formed at the distal end part of the side walls.

The structure of the cover J10 prevents foreign matter such as dust, water and fine solid particles from entering into the inside of the portable transmitter through the penetration holes J33 and the matching faces between the first case J31 and the second case J32. That is, the structure of the cover J10 prevents the circuit substrate J20, etc. from being exposed to foreign matter such as dust, water and fine solid particles.

The outer case J40 has one or more opening parts J43 at the position which is opposite to the corresponding tact switches J21. That is, the number of the opening parts J43 corresponds to the number of the tact switches J21. Each of outer knobs J60 has a push button J63. The push button J63 of the outer knob J60 projects toward the inner case J30 side. The outer knob J60 is pushed onto the outer case J40.

In more detail, the outer knob J60 is placed in the corresponding opening part J43. A sheet J70 is placed between the outer knobs J60 and the first case J31. The sheet J70 is made of elastic material such as rubber. The sheet J70 has projection parts J71 which projects toward the outer knobs J60. The projection parts J71 of the sheet J70 correspond to the outer knobs J60 and the tact switches J21.

The front end part of each of the projection parts J71 in the sheet J70 is contacted with the corresponding push button J63. The part of the sheet J70 which is opposite to the front end part of the projection parts J71 is contacted with the cover J10. In the portable transmitter shown in FIG. 8, the projection parts J71 in the sheet J70 are elastically deformed and placed between the outer knobs J60 and the first case J31.

That is, as shown in FIG. 8, the outer knob J60 is placed in the corresponding opening part J43 while the outer peripheral edge part of the outer knob J60 is pushed toward the outer case J40 by repulsive elastic stress of the corresponding projection part J71.

When the user (or the driver) of a vehicle pushes one of the outer knobs J60 in the conventional portable transmitter having the above structure, the pushed force is applied to the corresponding contact switch J21 through the projection part J71 and the cover J10, the corresponding tact switch J21 is thereby turned on. When the tact switch J21 is turned on, one or more circuit modules formed on the circuit substrate J21 starts to execute a predetermined process according to the condition of the tact switch J21.

By the way, in the conventional portable transmitter having the above structure shown in FIG. 8, the outer knobs J60 and the outer case J40 are different members, respectively, not assembled into one body. That is, the outer peripheral edge part of the outer knob J60 is forcedly pushed onto the outer case J70 by repulsive elastic stress applied from the projection part J71 formed in the sheet J70. The recent trend in the technical field of the portable transmitters is to decrease the total number of components of the portable transmitter and the manufacturing cost thereof. The conventional portable transmitters do not satisfy the above trend.

SUMMARY OF THE INVENTION

It is an object of the present invention to provide a portable transmitter comprised of a reduced number of components and to manufacture the portable transmitter with a low cost.

To achieve the above purposes, the present invention provides a portable transmitter comprised of a circuit substrate 20, an inner case 30, a cover 10, an outer case 40, and one or more outer knobs 60.

One or more tact switches 21 and circuit modules are mounted on the circuit substrate 20. The inner case 30 has a first case 31 and a second case 32. The first case 31 and the second case 32 are assembled in one body. The first case 31 is comprised of a bottom surface and side walls. The side walls surround the bottom surface of the first case 31. Similarly, the second case 32 is comprised of a bottom surface and side walls. These side walls of the second case 32 surround the bottom surface. The inner case 30 accommodates the circuit substrate 20 so that one surface of the circuit substrate 20 faces the first case 31 of the inner case 30. One or more penetration holes 33 corresponding to the tact switches 21 are formed in the first case 31 of the inner case 30. The penetration holes 33 face the tact switches 21 formed on the circuit substrate 20 which is placed in the inner case 30.

The cover 10 is placed between the circuit substrate 20 and the first case 31. The cover 10 is further placed in the inner case 30 while the cover 10 is supported between the first case 31 and the second case 32 in order to seal a space formed between the first case 31 and the second case 32.

The outer case 40 accommodates the inner case 30. The outer case 40 is comprised of opening parts 43 formed at the side which faces the tact switches 21 formed on the circuit substrate 20.

One or more outer knobs 60 of a plate shape are placed in the corresponding opening parts 43, while one surface of each of the outer knobs 60 is exposed to the outside of the portable transmitter. In the portable transmitter according to the present invention, the cover 10 is made of elastic member and has one or more projection parts 12. Each of the projection parts 12 projects toward the corresponding opening part 43 from the corresponding penetration hole 33. The front end part of the projection part 12 is contacted to the corresponding outer knob 60.

The opposite part of the projection part 12 which is opposite to its front end part is contacted to the corresponding tact switch 21 while the projection part 12 is elastically deformed. Each of the outer knobs 60 is placed in the corresponding opening part 43 while the outer peripheral part of the corresponding outer knob 60 is pushed onto the outer peripheral part of the corresponding opening part 43 formed in the outer case 40 by elastic force of the cover 10.

The portable transmitter according to the present invention having the above structure makes it possible to protect the circuit substrate 20, which is placed between the cover 10 and the second case 32, by the cover 10. This structure further makes it possible for the cover 10 to push the outer knobs 60 to the outer case 40, and to place the outer knobs 60 in the corresponding opening parts 43. That is, the outer knobs 60 are placed in the corresponding opening parts 43 while the outer knobs 60 are pushed onto the outer case 40 by the cover 10. That is, the cover 10 has both the function of protecting the circuit substrate 20 from foreign matter such as dust, water and fine solid particles, and the function of supporting the outer knobs 60.

The cover 10 in the portable transmitter according to the present invention acts as the cover and the sheet used in the conventional portable transmitter (for example, having the conventional structure shown in FIG. 8). The structure of the portable transmitter according to the present invention makes it possible to decrease the total number of components of the portable transmitter, and to decrease the working load of assembling the components to make the portable transmitter.

In the portable transmitter as other aspect of the present invention, the cover 10 has a bottom surface and side walls which surround the bottom surface. The bottom surface of the cover 10 has one or more the projection parts 12 and load distributing parts 13. Each of the load distributing parts 13 has a curved shape formed on the bottom surface of the cover 10 at the outer peripheral part of the corresponding projection part 12. A flange 11 is formed at the side walls of the cover 10. The inner case 30 accommodates the cover 10 while the flange 11 of the cover 10 is supported between the first case 31 and the second case 32.

The portable transmitter according to the present invention has the load distributing parts 13. Each of the load distributing parts 13 has a curved shape which is formed by bending the bottom surface of the cover 10. Because the load distributing parts 13 relax a part of the pushing force by expanding the load distributing parts 13 when the user or the driver pushes one of the outer knobs 60.

That is, the pushing force applied from one of the outer knobs 60 is relaxed by the corresponding load distributing part 13, and the decreased pushing force is then applied to the corresponding tact switch 21. In other words, a small pushing force rather than the pushing force applied through the outer knob 60 is applied to the tact switch 21.

The load distributing part 13 can relax the pushing force when the pushing force is applied to the corresponding outer knob 60, and the decreased pushing force as a small pushing force is then applied to the tact switch 21.

When the pushing force is applied to the outer knob 60 of the portable transmitter according to the present invention, a smaller pushing force is applied to the tact switch 21 of the portable transmitter when compared with the conventional portable transmitter without any load distributing part. This structure of the portable transmitter according to the present invention makes it possible to suppress the tact switch 21 from being turned on when accidental operation is performed by the user or driver because the small pushing force, than the pushing force applied to the outer knob 60, is applied to the tact switch 21.

In the portable transmitter as other aspect of the present invention, each of the projection parts 12 formed on the cover 10 has a cylindrical shape with a hollow part. The projection part 12 further has one or more sub-projection parts 12a formed on the end part of the projection part 12.

Each of the projection parts 12 of the cover 10 is placed in the corresponding penetration hole 33 formed in the first case 31 of the inner case 30 at the end part side of the outer case 40. The sub-projection parts 12a of each of the projection parts 12 are contacted to the corresponding outer knob 60 when the inner case 30 accommodates the cover 10.

The structure of the projection part 12 having the sub-projection parts 12a makes it possible to easily change repulsive elastic stress applied to the corresponding outer knob 60 from the projection part 12 by changing the size and shape of the sub-projection parts 12a when compared with the structure of the projection part 12 without any sub-projection part.

BRIEF DESCRIPTION OF THE DRAWINGS

A preferred, non-limiting embodiment of the present invention will be described by way of example with reference to the accompanying drawings, in which.

DETAILED DESCRIPTION OF THE PREFERRED EMBODIMENTS

Figure 1:
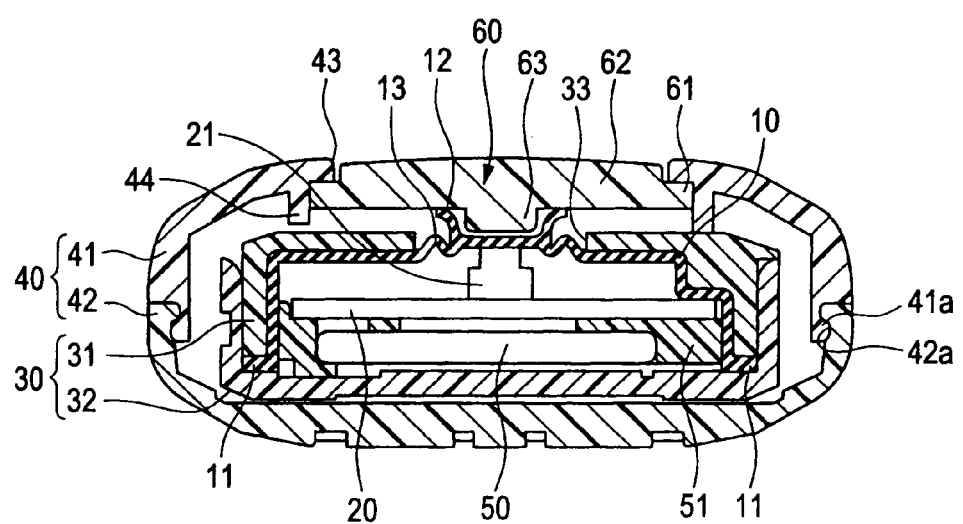
FIG. 1 is a view showing a cross section of the portable transmitter according to an embodiment of the present invention.

Hereinafter, various embodiments of the present invention will be described with reference to the accompanying drawings. In the following description of the various embodiments, like reference characters or numerals designate like or equivalent component parts throughout the several diagrams.

Embodiment

A description will be given of the portable transmitter according to an embodiment of the present invention with reference to FIG. 1 to FIG. 7A and FIG. 7B.

Figure 2:
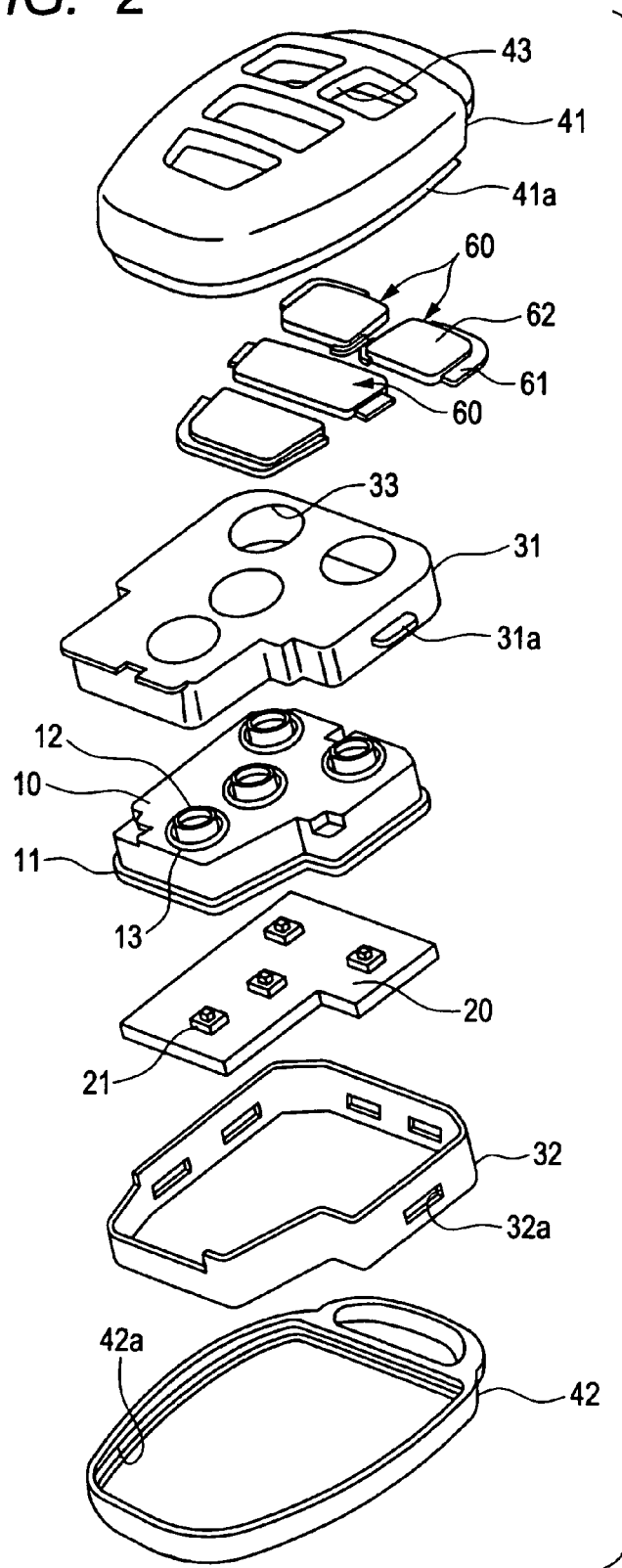
FIG. 2 is a perspective view showing details of components in the portable transmitter according to the embodiment of the present invention shown in FIG. 1.

FIG. 1 is a view showing a cross section of the portable transmitter according to an embodiment of the present invention. FIG. 2 is a perspective view showing details of components in the portable transmitter according to the embodiment shown in FIG. 1.

The portable transmitter according to the embodiment can be applied to various types of keyless-entry systems capable of locking and unlocking doors, for example, the car doors without using any mechanical key.

A description will now be given of the case in which the portable transmitter is applied to a key-less entry system of a vehicle.

As shown in FIG. 1 and FIG. 2, the portable transmitter according to the embodiment is comprised of an inner case 30, an outer case 40, a cover 10, a circuit substrate 20, and one or more outer knobs 60.

The inner case 30 accommodates the cover 10 and the circuit substrate 20, etc.

The inner case 30 is made of resin and accommodates the cover 10 and the circuit substrate 20, etc.

The inner case 30 is comprised of a first case 31 and a second case 32. The first case 30 and the second case 32 are assembled in one body. The first case 31 is comprised of a bottom surface of an approximate rectangle shape and side walls. The side walls surround the bottom surface of the first case 31. Similar to the structure of the first case 30, the second case 32 is comprised of a bottom surface of an approximate rectangle shape and side walls. The side walls surround the bottom surface of the second case 32.

Specifically, the side walls of the first case 31 have lock-projection parts 31a formed on the side walls thereof. The side walls of the second case 32 also have lock-hole parts 32a formed in the side walls thereof. The inner case 30 is assembled by fitting the lock-projection part 31a to the corresponding lock-hole part 32a.

The first case 31 has one or more penetration holes 33 in the surface, which correspond to the tact switches 21 (which will be explained later) formed on the circuit substrate 20 when the first case 31, the second case 32, the cover 10, and the circuit substrate 20 are assembled together.

Each of the tact switches 21 is a switch of a push-button type and mounted on one surface of the circuit substrate 20. Circuit modules such as terminals, an antenna, and integrated circuits (ICs) are mounted on the other surface of the circuit substrate 20 which is opposite to the surface on which the tact switches 21 are mounted.

The surface of the circuit substrate 20 on which the tact switches 21 are mounted is placed at the first case 31 side of the inner case 30.

A button battery 50 is placed in a battery holder 51. The battery holder 51 with the button battery 50 is placed between the circuit substrate 20 and the second case 32. The electrodes of the button battery 50 are electrically connected to a positive terminal and a negative terminal formed on the circuit substrate 20. The button battery 50 supplies a necessary electric power to the circuit substrate 20. The button battery 50 is omitted from FIG. 2.

The cover 10 is placed between the circuit substrate 20 and the first case 31. Further, the inner case 30 accommodates the cover 10 while the cover 10 is supported between the first case 31 and the second case 32. The cover 10 and the second case 32 makes a sealed space.

Specifically, the cover 10 is made of elastic material such as rubber, etc. The cover 10 approximately has the same outer shape of the first case 31. The cover 10 is comprised of the bottom surface and the end walls which surround the bottom surface. The distal end part of the side walls of the cover 10 has the flange 11. As shown in FIG. 1, The inner case 30 accommodates the cover 10 while the bottom surface of the cover 10 is placed along the bottom surface of the first case 31 and the flange 11 of the cover 10 is fitted and supported between the first case 31 and the second case 32. This structure of the inner case 30 and the cover 10 suppresses foreign matter such as dust, water and fine solid particles from entering the inside of the portable transmitter according to the embodiment. That is, this structure of the portable transmitter of the embodiment prevents the circuit substrate 20, etc. from being exposed to foreign matter such as dust, water and fine solid particles. The cover 10 acts as a protection member to prevent the circuit substrate 20, etc. from being exposed to foreign matter such as dust, water and fine solid particles.

As shown in FIG. 1 and FIG. 2, the cover 10 is a single member made of elastic member. The cover 10 has one or more projection parts 12. The projection parts 12 formed on the cover 10 project toward opening parts 43 (which will be explained later) formed in the third case 41 of the outer case 40. Each of the opening parts 43 corresponds to each of the penetration holes 33 formed in the first case 31 when the cover 10 and the inner case 30 are assembled together.

The front part of each of the projection parts 12 formed on the cover 10 is contacted with the bottom surface of the corresponding outer knob 60. The structure of the outer knob 60 will be explained later. The part in the cover 10 which is opposite to the front part of the projection part 12 is contacted with the corresponding tact switch 21. The inner case 30 accommodates the cover 10 while the projection parts 12 of the cover 10 are elastically deformed. Each of the projection part 12 of the cover 10 has a cylindrical shape with a hollow part. As shown in FIG. 2, this hollow part in the projection part 12 is open at the front end part thereof in its projection direction.

As shown in FIG. 1 and FIG. 2, the cover 10 further has one or more load distributing parts 13 of a curved shape. The load distributing parts 13 are formed in the bottom surface of the cover 10 which correspond to the position of the penetration holes 33, respectively. In the cover 10, each of the load distributing parts 13 surrounds the corresponding projection part 12.

The outer case 40 is made of resin, etc. The outer case 40 accommodates the inner case 30. The outer case 40 is comprised of the third case 41 and a fourth case 42 which are assembled in one body. The third case 41 is comprised of a bottom surface of a rectangle shape and side walls. The side walls surround the end part of the bottom surface of the third case 41. Similar to the third case 41, the fourth case 42 is comprised of a bottom surface of a rectangle shape and side walls. The side walls surround the end part of the bottom surface of the fourth case 42. Specifically, as shown in FIG. 2, one or more lock-projection parts 41a are formed at the side walls of the third case 41. In addition, one or more lock-hole parts 42a are formed at the side walls of the fourth case 42. The number of the lock-projection parts 41a corresponds to the number of the lock-hole parts 42a.

Similar to the inner case 30 comprised of the first case 31 and the second case 32, the third case 41 and the fourth case 42 of the outer case 40 are assembled by fitting the lock-projection part 41a to the lock-hole part 42a.

One or more opening parts 43 are formed in the fourth case 42 of the outer case 40. The opening parts 43 correspond to the tact switches 21, and the penetration holes 33, respectively.

As shown in FIG. 2, the portable transmitter has the opening parts 43 and the outer knobs (or switch knobs) 60.

Each of the opening part 43 is larger in size than the corresponding tact switch 21 and the corresponding penetration hole 31. The corresponding outer knob 60 is placed in this opening part 43.

The outer knob 60 is made of resin, etc. The outer knob 60 has a plate shape. One surface of the outer knob 60 is exposed to the outside of the portable transmitter through the opening part 43. In more detail, the outer knob 60 is comprised of a thin part 61 and a thick part 62 shown in FIG. 2.

The thin part 61 has a step-shaped structure at the outer peripheral part of the outer knob 60. The thick part 62 shown in FIG. 2 and a push-button part 63 shown in FIG. 1 are assembled in one body.

The outer knob 60 is placed in the corresponding opening part 43 while the outer knob 60 is exposed to the outside of the portable transmitter and the thin part 61 of the outer knob 60 is pushed toward the inside of the outer case 40.

Specifically, the outer knob 60 is placed in the corresponding opening part 43 as follows. The push-button part 63 of the outer knob 60 is arranged in the hollow part of the corresponding projection part 12 formed on the cover 10. The thick part 62 of the outer knob 60 is contacted with the corresponding projection part 12 of the cover 10. That is, because the outer knob 60 is contacted with the corresponding projection part 12 which is elastically deformed, the outer knob 60 is placed in the corresponding opening part 43 formed in the outer case 40 while repulsive elastic stress of the projection part 12 is applied toward the outer case 40. That is, the outer knob 60 is placed in the corresponding opening part 43 of the outer case 40 so that the thin part 61 of the outer knob 60 is pushed onto the wall surface of the outer case 40, which is positioned at the outer peripheral part of the opening part 43, by the elastic force of the corresponding projection part 12 of the cover 10.

That is, the cover 10 of the portable transmitter according to the embodiment has both the protection function of protecting the circuit substrate 20 and the function of protecting the outer knobs 60.

In the structure of the portable transmitter according to the embodiment, a double-color-molded functional display part (not shown) is formed on the surface of each of the outer knobs 60 which is exposed to the outside. The double-color-molded functional display part of the outer knob 60 shows selectable functions of the portable transmitter.

Further, as shown in FIG. 1, the third case 41 of the outer case 40 has a guide 44 which projects toward the inner case 30 side at the outer peripheral part of the opening parts 43, namely, at the part of the outer case 40 which is contacted with the thin part 61 of the outer knob 60.

The guide 44 suppresses the outer knobs 60 from being inclined to the opening parts 43 side when the driver of the portable transmitter pushes one of the outer knobs 60. That is, the outer knob 60 is deformed along the guide 44 when the driver of the portable transmitter pushes the outer knob 60.

For example, the third case 41 in the outer case 40 is equipped with a mechanical key (not shown) such as an engine key and a door key. This mechanical key is made of metal and made by machining. In general, as well known, the mechanical key and the third case 41 are assembled in one body by using insert molding process.

When the user or the driver pushes one of the outer knobs 60 in order to unlock the car doors, and when the corresponding tact switch 21 is thereby turned on through the corresponding projection part 12 by the pushing force of the outer knob 60, the circuit mounted on the circuit substrate 20 generates and transmits a signal of a predetermined frequency to the vehicle. The doors of the vehicle are thereby unlocked.

Because the cover 10 has the load distributing parts 13. Each of the load distributing parts 13 is the curved bottom surface of the cover 10, when the pushing force is applied to the target outer knob 60, the load distributing part 13 is expanded by the applied pushing force. This relaxes the applied pushing force. That is, when the user or the driver pushes the target outer knob 60, the corresponding tact switch 21 is pushed by a small pushing force because the pushing force applied to the target outer knob 60 is relaxed by the load distributing part 13. In other words, such a small pushing force which is smaller than the applied pushing force is applied to the target tact switch 21.

As described above in detail, the portable transmitter according to the embodiment has the cover 10. This cover 10 has both the protection function of protecting the circuit substrate 20, etc. from being exposed to foreign matter such as dust, water and fine solid particles, and the supporting function of supporting the outer knob 60.

Figure 8:
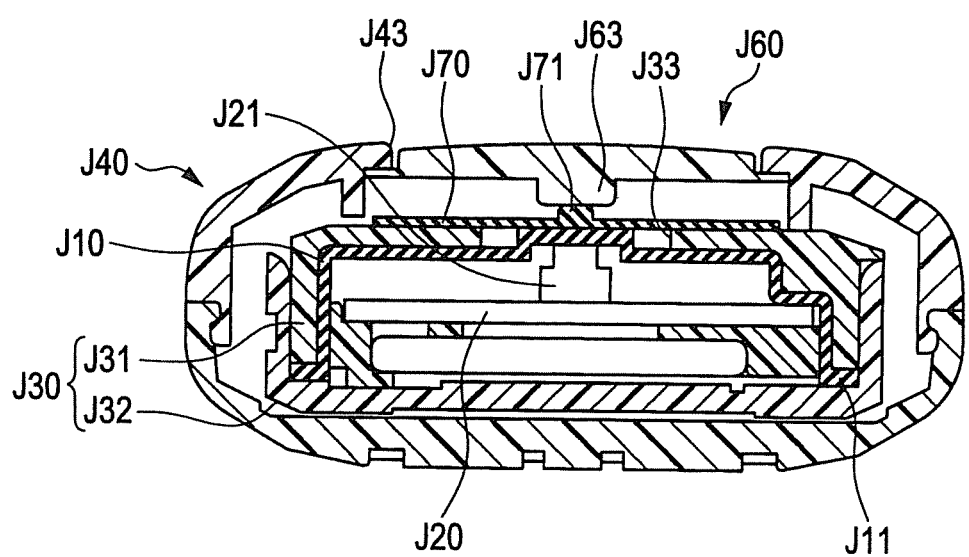
FIG. 8 is a view showing a cross section of a conventional portable transmitter.

The cover 10 in the portable transmitter according to the embodiment shown in FIG. 1 and FIG. 2 has both the function of the cover J10 and the function of the sheet J70 in the conventional portable transmitter previously described shown in FIG. 8.

The structure of the portable transmitter according to the embodiment makes it possible to decrease the total number of components and the manufacturing cost thereof. Further, the structure of the portable transmitter according to the embodiment makes it possible to reduce the working load when the components of the decreased number are assembled in order to make the portable transmitter.

In the portable transmitter, the outer knob 60 is contacted with the part at the front end part of the cover 10 in the direction of the corresponding projection part 12, the corresponding tact switch 21 is contacted with the opposite part of the cover which is opposite to the front end part of the cover 10 while the projection part 12 is elastically deformed and the inner case 30 accommodates the cover 10. In this structure of the portable transmitter, a predetermined load is applied to the tact switch 21 by the repulsive elastic force from the cover 10. In general, the portable transmitter having the above structure has the drawback to easily turn on the tact switch by a small pushing force when the user or the driver puts the portable transmitter into his pockets, and the outer knob of the portable transmitter is pushed when accidental operation is performed by the user or driver.

On the other hand, the portable transmitter according to the embodiment has the load distributing parts 13 at the outer peripheral part of the projection parts 12 formed on the cover 10. The load distributing part 13 can relax the applied pushing force when the pushing force is applied to the target outer knob 60, and the decreased pushing force is then applied to the corresponding tact switch 21.

When the pushing force is applied to the target outer knob 60 of the portable transmitter according to the embodiment, a smaller pushing force is applied to the corresponding tact switch 21 when compared with the conventional portable transmitter without any load distributing part.

The structure of the portable transmitter according to the embodiment makes it possible to suppress the tact switch 21 from being turned on when accidental operation is performed by the user or driver because the smaller pushing force, than the pushing force applied to the outer knob 60, is applied to the tact switch 21.

Still further, the repulsive elastic stress is applied to the outer knob 60 from the corresponding projection part 12 at the rear surface which is opposite to the main surface of the outer knob 60 on which the double-color-molded functional display part (not shown) is printed. This structure makes it possible to suppress the outer knob 60 from being pushed onto the outer case 40 while the outer knob 60 is inclined when compared with the structure in which the pushing force is applied to the projection part 12 from the push-button part 63.

Still further, the cover 10 of the portable transmitter according to the embodiment has both the function of the cover J10 and the function of the sheet J70 in the conventional portable transmitter shown in FIG. 8. In other words, one component in the portable transmitter according to the embodiment acts as the two components in the conventional portable transmitter. This makes it possible to decrease the accumulated tolerance caused in the production of the conventional portable transmitter.

Still further, the structure of the conventional portable transmitter shown in FIG. 8 has the sheet J70 and the cover J10 placed between the outer knobs J60 and the tact switches J21. This structure of the conventional portable transmitter causes a dimension error between the sheet J70 and the cover J10 when they are assembled together.

On the other hand, the cover 10 is only placed between the outer knob 60 and the tact switch 21 in the portable transmitter according to the embodiment. The pushing force applied to the tact switch 21 is affected by the dimension error of the cover 10 only.

Accordingly, when compared with the structure of the conventional portable transmitter shown in FIG. 8, the structure of the portable transmitter according to the embodiment makes it possible to suppress the pushing force necessary to turn on the tact switch 21 from being fluctuated.
(Other Modifications)

In the embodiment previously described, the projection parts 12 formed on the cover 10 in the portable transmitter has a cylindrical shape as shown in FIG. 1 and FIG. 2. The concept of the present invention is not limited by this structure of the projection parts 12. For example, it is possible for each of the projection parts 12 formed on the cover 10 to have the following shape.

Figure 3A:
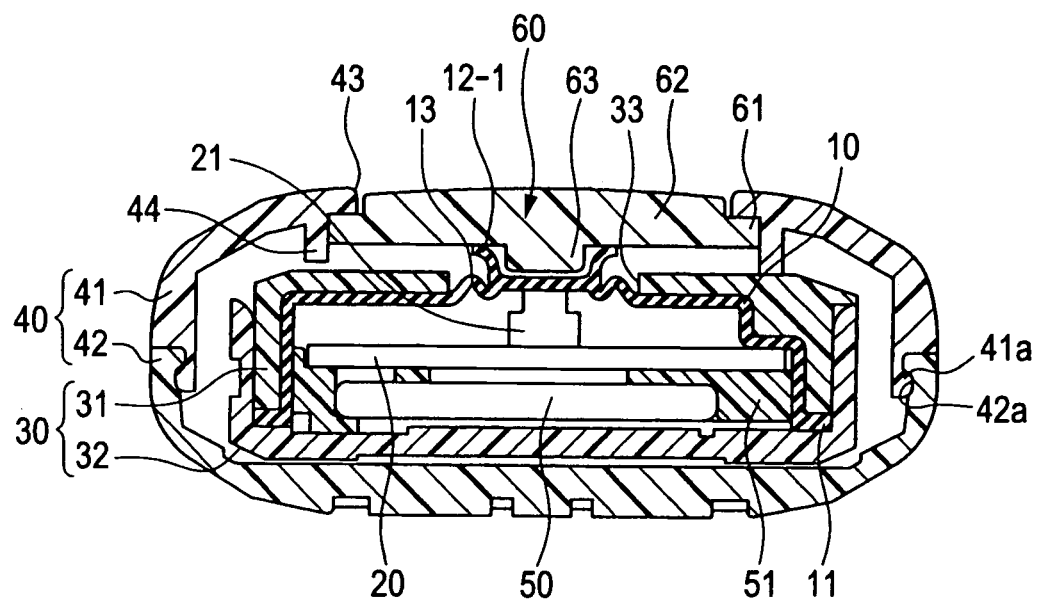
FIG. 3A is a view showing a cross section of the portable transmitter having the projection parts of other configuration according to the embodiment of the present invention.
Figure 3B:
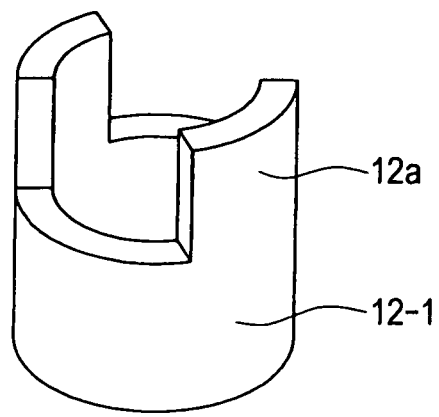
FIG. 3B is a perspective view showing a structure of the projection part shown in FIG. 3A.

FIG. 3A is a view showing a cross section of the portable transmitter having the projection part 12-1 formed on the cover 10 of other configuration according to the embodiment of the present invention. FIG. 3B is a perspective view showing the structure of the projection part 12-1 shown in FIG. 3A.

As shown in FIG. 3A and FIG. 3B, each of the projection parts 12-1 has a cylindrical shape with sub-projection parts 12a. The sub-projection parts 12a of each of the projection parts 12-1 are placed at the end part of the outer case 40. That is, it is possible for the portable transmitter to have the structure in which the sub-projection parts 12a of each of the projection parts 12-1 are contacted with the thick part 62 of the corresponding outer knob 60.

Still further, it is possible for the projection part 12 of the cover 10 to have the following shape.

Figure 4A:
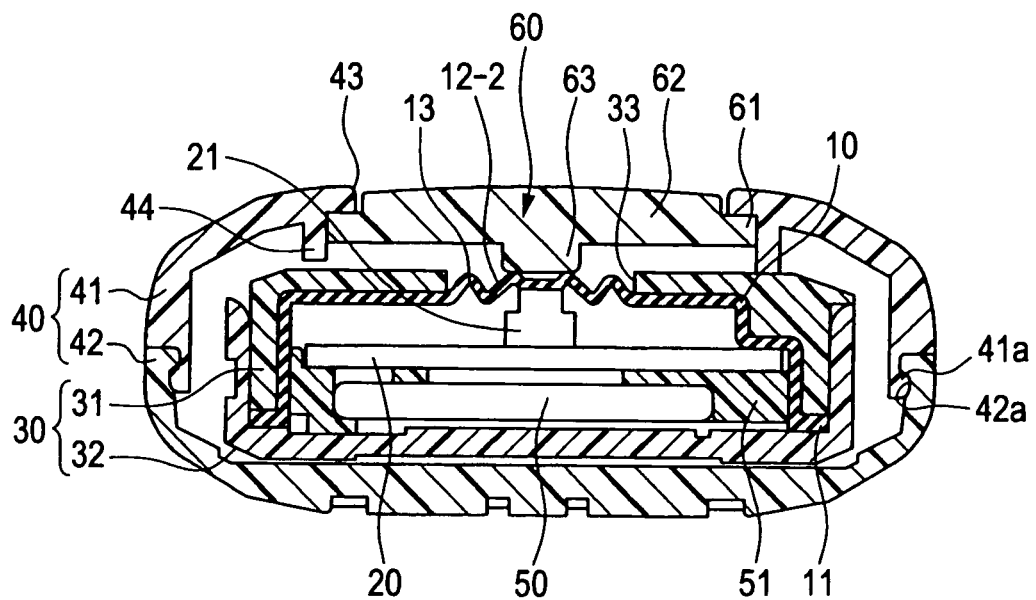
FIG. 4A is a view showing a cross section of the portable transmitter having the projection parts of other configuration according to the embodiment of the present invention.
Figure 4B:
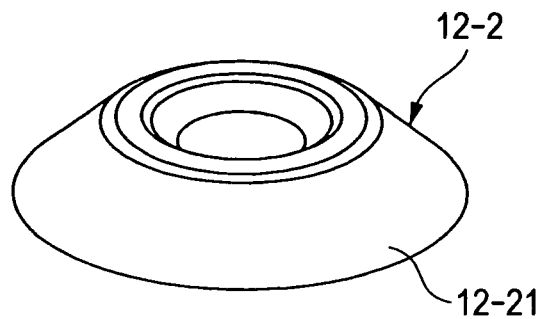
FIG. 4B is a perspective view showing a structure of the projection part shown in FIG. 4A.

FIG. 4A is a view showing a cross section of the portable transmitter having the projection parts 12-2 of other configuration according to the embodiment of the present invention. FIG. 4B is a perspective view showing a structure of the projection part 12-2 shown in FIG. 4A.

As shown in FIG. 4A and FIG. 4B, the projection part 12-2 has a semi-conical shape and has a tapered part 12-21 in which the diameter of the projection part 12-2 is gradually decreased toward the top of the projection part 12-2. Further, the distal end of the projection part 12-2 has a hollow part. The push-button part 63 of the corresponding outer knob 60 is contacted to the distal end of the projection part 12-2.

Still further, it is possible for each of the projection parts 12 formed on the cover 10 to have the following shape.

Figure 5A:
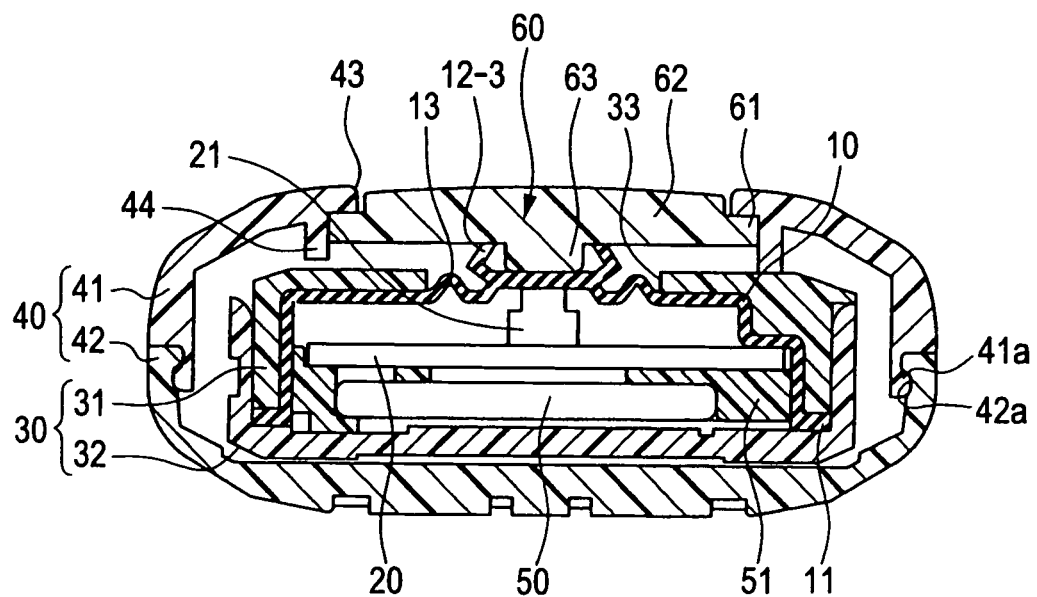
FIG. 5A is a view showing a cross section of the portable transmitter having the projection parts of other configuration according to the embodiment of the present invention.
Figure 5B:
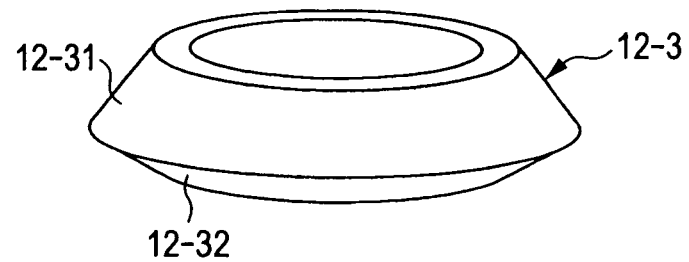
FIG. 5B is a perspective view showing a structure of the projection part shown in FIG. 5A.

FIG. 5A is a view showing a cross section of the portable transmitter having the projection parts 12-3 of other configuration according to the embodiment of the present invention. FIG. 5B is a perspective view showing a structure of the projection part 12-3 shown in FIG. 5A.

As shown in FIG. 5A and FIG. 5B, the projection part 12-3 has a semi-conical shape with a hollow part, and has a tapered part. In the tapered part of the projection part 12-3, the diameter of a front half part thereof is gradually increased toward the central part of the projection part 12-3 and the diameter of the remained part 12-32 as a rear half of the tapered part is gradually decreased from the central part of the projection part 12-3.

Further, the distal end part of the projection part 12-3 is contacted to the thick part 62 of the corresponding outer knob 60.

Moreover, it is possible for the projection parts 12 formed on the cover 10 to have the following shape.

Figure 6A:
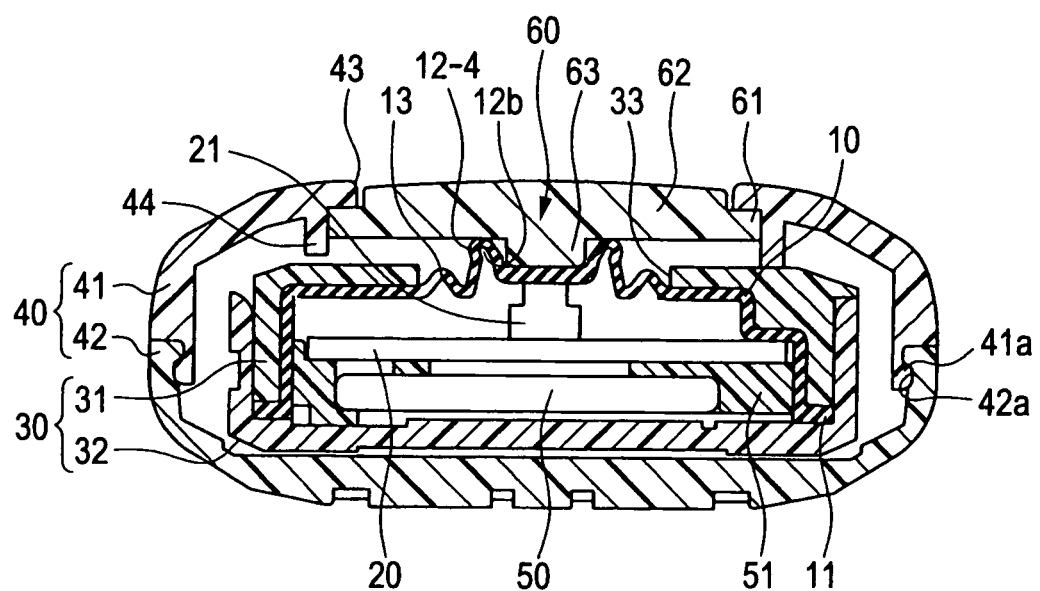
FIG. 6A is a view showing a cross section of the portable transmitter having the projection parts of other configuration according to the embodiment of the present invention.
Figure 6B:
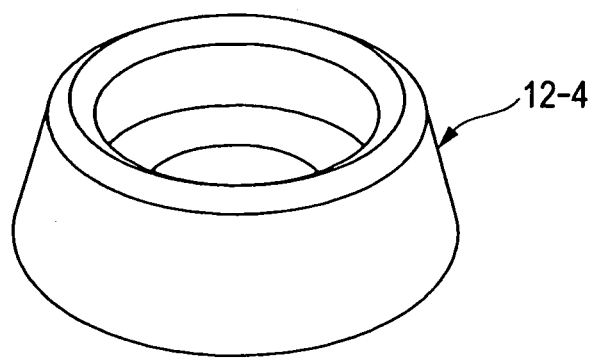
FIG. 6B is a perspective view showing a structure of the projection part shown in FIG. 6A.

FIG. 6A is a view showing a cross section of the portable transmitter having the projection parts 12-4 of other configuration according to the embodiment of the present invention. FIG. 6B is a perspective view showing a structure of the projection part 12-4 shown in FIG. 6A.

As shown in FIG. 6A and FIG. 6B, the projection part 12-4 has a semi-conical shape with a hollow part.

Each of the projection parts 12-4 has a gap 12b (see FIG. 6A) formed between the inner wall surface and the outer wall surface of the projection part 12-4. Further, the distal end part of the projection part 12-4 is contacted to the thick part 62 of the corresponding outer knob 60.

Still further, it is possible for the projection part 12 of the cover 10 to have the following shape.

Figure 7A:
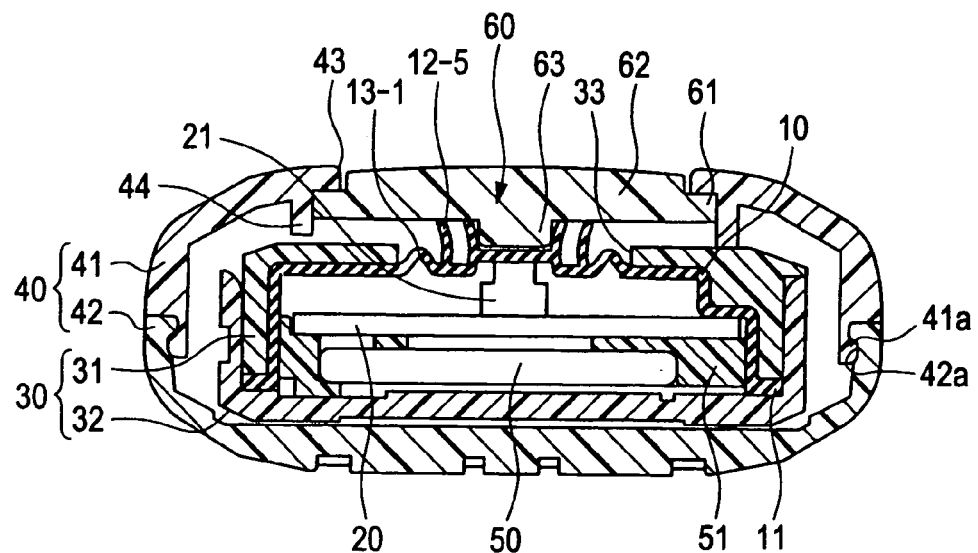
FIG. 7A is a view showing a cross section of the portable transmitter having the projection parts of other configuration according to the embodiment of the present invention.
Figure 7B:
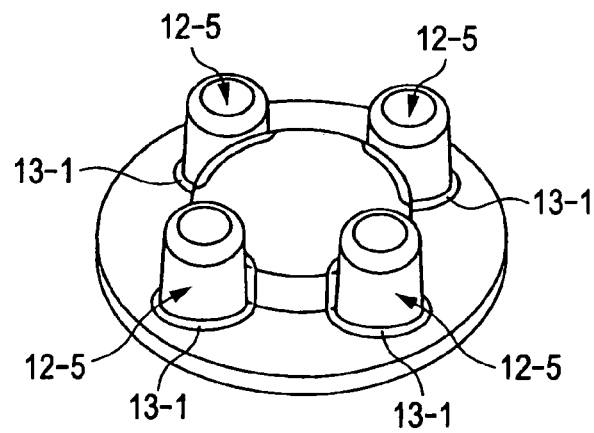
FIG. 7B is a perspective view showing a structure of the projection part shown in FIG. 7A.

FIG. 7A is a view showing a cross section of the portable transmitter having a plurality of projection parts 12-5 of other configuration according to the embodiment of the present invention. FIG. 7B is a perspective view showing a structure of the projection parts 12-5 shown in FIG. 7A. In particular, FIG. 7B also shows the cover 10 near the projection parts 12-5.

As shown in FIG. 7A and FIG. 7B, the each of the projection parts 12-5 has a cylindrical shape, and the distal end part of each of the projection parts 12-5 is contacted to the thick part 62 of the corresponding outer knob 60.

In the structure of the portable transmitter shown in FIG. 7A and FIG. 7B, the load distributing part 13-1 is formed at the outer peripheral part of each of the projection parts 12-5. However, the concept of the present invention is not limited by this structure. For example, it is possible for the cover 10 in the portable transmitter to have a single load distributing part which surrounds the entire of the projection parts 12-5.

In particular, as shown in FIG. 3A and FIG. 3B, when the projection part 12 further has the sub-projection parts 12a, it is possible to easily change the repulsive elastic stress applied to the target outer knob 60 from the corresponding projection part 12 by changing the size and shape of the sub-projection parts 12a as compared with the structure in which the projection part 12 has no sub-projection part.

The embodiment of the portable transmitter previously described shows the structure equipped with the load distributing part 13. The concept of the present invention is not limited by this structure.

The cover 10 in the portable transmitter according to the embodiment has the function of protecting the circuit substrate 20 and the function of supporting the outer knobs 60. This structure of the portable transmitter according to the embodiment makes it possible to decrease the total number of the components and the manufacturing cost thereof when compared with the structure of the conventional portable transmitter, for example, shown in FIG. 8.

Still further, the embodiment shows the load distributing part 13 surrounds the corresponding projection part 12 in the portable transmitter. The concept of the present invention is not limited by this structure. For example, it is possible to form the load distributing part 13 composed of fragmentary parts or separate parts at the outer peripheral part of each of the projection parts 12. In this structure, the fragmentary parts or the separate parts forming the load distributing part 13 are formed along the outer peripheral part of each of the projection parts 12.

Still further, the embodiment of the portable transmitter previously described shows the structure in which the load distributing part 13 is formed at the corresponding penetration hole 33 at the outer peripheral part of the projection part 12. The concept of the present invention is not limited by this structure. For example, it is possible to arrange the load distributing parts 13 at the position which is opposite to the bottom surface of the first case 31, which does not correspond in position to the penetration holes 33 formed in the cover 10.

While specific embodiments of the present invention have been described in detail, it will be appreciated by those skilled in the art that various modifications and alternatives to those details could be developed in light of the overall teachings of the disclosure. Accordingly, the particular arrangements disclosed are meant to be illustrative only and not limited to the scope of the present invention which is to be given the full breadth of the following claims and all equivalents thereof.

What is claimed is:

1. A portable transmitter comprising:
 a circuit substrate on which one or more tact switches and circuit modules are mounted;
 an inner case comprised of a first case and a second case which are assembled into one body, the first case being comprised of a bottom surface and side walls which surround the bottom surface, the second case being comprised of a bottom surface and side walls which surround the bottom surface, the inner case accommodating the circuit substrate so that one surface of the circuit substrate faces the first case, and one or more penetration holes being formed in the first case at a position which faces corresponding tact switches formed on the circuit substrate;
 a cover placed between the circuit substrate and the first case, and further placed in the inner case with the cover being supported between the first case and the second case in order to seal a space formed between the first case and the second case;
 an outer case accommodating the inner case and comprised of opening parts formed at a side which faces the tact switches formed on the circuit substrate, and
 one or more outer knobs of a plate shape placed in the corresponding opening parts, with one surface of each of the outer knobs being exposed to the outside of the portable transmitter, wherein
 the cover is made of a single piece elastic member and has projection parts, each of the projection parts projects toward a corresponding opening part from a corresponding penetration hole, a front end part of the projection part contacts a corresponding outer knob, and an opposite part of the projection part which is opposite to the front end part contacts a corresponding tact switch when the projection part is elastically deformed,
 each of the outer knobs is placed in the corresponding opening part while an outer peripheral part of the outer knob is pushed onto the outer peripheral part of the corresponding opening part formed in the outer case by elastic force of the cover;
 the cover comprises a bottom surface and side walls, the side walls of the cover surround the bottom surface, and the bottom surface of the cover includes the projection parts and load distributing parts, each of the load distributing parts has a non-linear curved shape on the bottom surface of the cover at an outer peripheral part of a corresponding projection part;
 each of the load distributing parts has a protruding shape which projects toward a direction parallel to a depressing direction when the operator pushes the outer knob;
 each of the load distributing parts is arranged directly below the corresponding outer knob and has a protruding part of the protruding shape in a direction at right angle to the corresponding outer knob, and the each of the load distributing parts buffers a depressed force generated when the corresponding outer knob is pushed.

2. The portable transmitter according to claim 1, wherein the cover comprises flanges formed at the side walls of the cover, and the inner case accommodates the flanges of the cover while the flanges are supported between the first case and the second case.

3. The portable transmitter according to claim 1, wherein each of the projection parts formed on the cover has a cylindrical shape with a hollow part and further has one or more sub-projection parts formed on the end part of the projection part, each of the projection parts is placed in the corresponding penetration hole formed in the first case of the inner case at the end part side of the outer case, and the sub-projection parts of each of the projection parts are contacted with the corresponding outer knob when the inner case accommodates the cover.

4. The portable transmitter according to claim 1, wherein each of the projection parts formed on the cover has a semi-conical shape with a hollow part, and has a tapered part in which the diameter of the projection part is gradually decreased toward the top of the projection part, and a distal end part of the projection part has a concave shape.

5. The portable transmitter according to claim 1, wherein each of the projection parts formed on the cover has a semi-conical shape with a hollow part, and has a tapered part in which the diameter of a front half part of the tapered part is gradually increased toward the central part of the projection part and the diameter of a rear half part as the remained part of the tapered part is gradually decreased from the central part of the projection part, and the distal end of the front half part of the projection part is contacted to a thick part of the corresponding outer knob.

6. The portable transmitter according to claim 1, wherein each of the projection parts formed on the cover has a semi-conical shape with a hollow part, and has a gap formed between the inner wall surface and the outer wall surface of the corresponding projection part, and the distal end part of the projection part is contacted to a thick part of the corresponding outer knob.

7. The portable transmitter according to claim 1, wherein each of the projection parts formed on the cover has a cylindrical shape with a hollow part, and the distal end parts of the projection parts are contacted to a thick part of the corresponding outer knob.

8. The portable transmitter according to claim 1, wherein:
each of the one or more outer knobs is supported and continuously lifted by an elastic force supplied by a respective projection part of the cover; and
an external load applied to by each of the one or more outer knobs is reduced by a respective load distribution part of the cover when a user exerts the external load by pushing each of the one or more outer knobs.

9. The portable transmitter according to claim 1, wherein the non-linear curved shape forms a V-shape.

10. The portable transmitter according to claim 1, wherein the load distribution parts expand when a pushing force is applied to the outer knobs.

11. The portable transmitter according to claim 1, wherein the non-linear curve shape forms an S-shape.

12. The portable transmitter according to claim 1, wherein the sidewalls of the cover, the bottom surface of the cover, the load distribution parts of the cover and the projection parts of the cover all have the same wall thickness.

13. The portable transmitter according to claim 1, wherein each of the projection parts extends directly from a radially inner end of a respective load distribution part.

14. The portable transmitter according to claim 1, wherein the non-linear curve shape includes a first portion extending from the bottom surface of the cover toward the corresponding outer knob, a second portion extending from the first portion away from the respective outer knob and a third portion extending from the second portion toward the corresponding outer knob.

15. The portable transmitter according to claim 1, wherein:
each of the one or more outer knobs includes a push-button part extending toward a respective tact switch from another surface opposite to the one surface, the another surface facing the circuit substrate; and
each of the projection parts includes an annular member that fully encircles a respective push-button part and each of the projection parts seats against the another surface of the corresponding outer knob.

16. The portable transmitter according to claim 15, wherein each of the projection parts include at least one sub-projection part, the at least one sub-projection part seating against the another surface of the corresponding outer knob.

17. The portable transmitter according to claim 14, wherein the third portion directly engages the projection part.

18. The portable transmitter according to claim 14, wherein the first portion is disposed radially outward from the second portion and the second portion is disposed radially outward from the third portion.

19. The portable transmitter according to claim 14, wherein the non-linear curve shape forms an S-shape.

* * * * *